No. 621,849. Patented Mar. 28, 1899.
F. E. RICKMAN
VALVE FOR PNEUMATIC TIRES.
(Application filed Sept. 28, 1898.)
(No Model.)
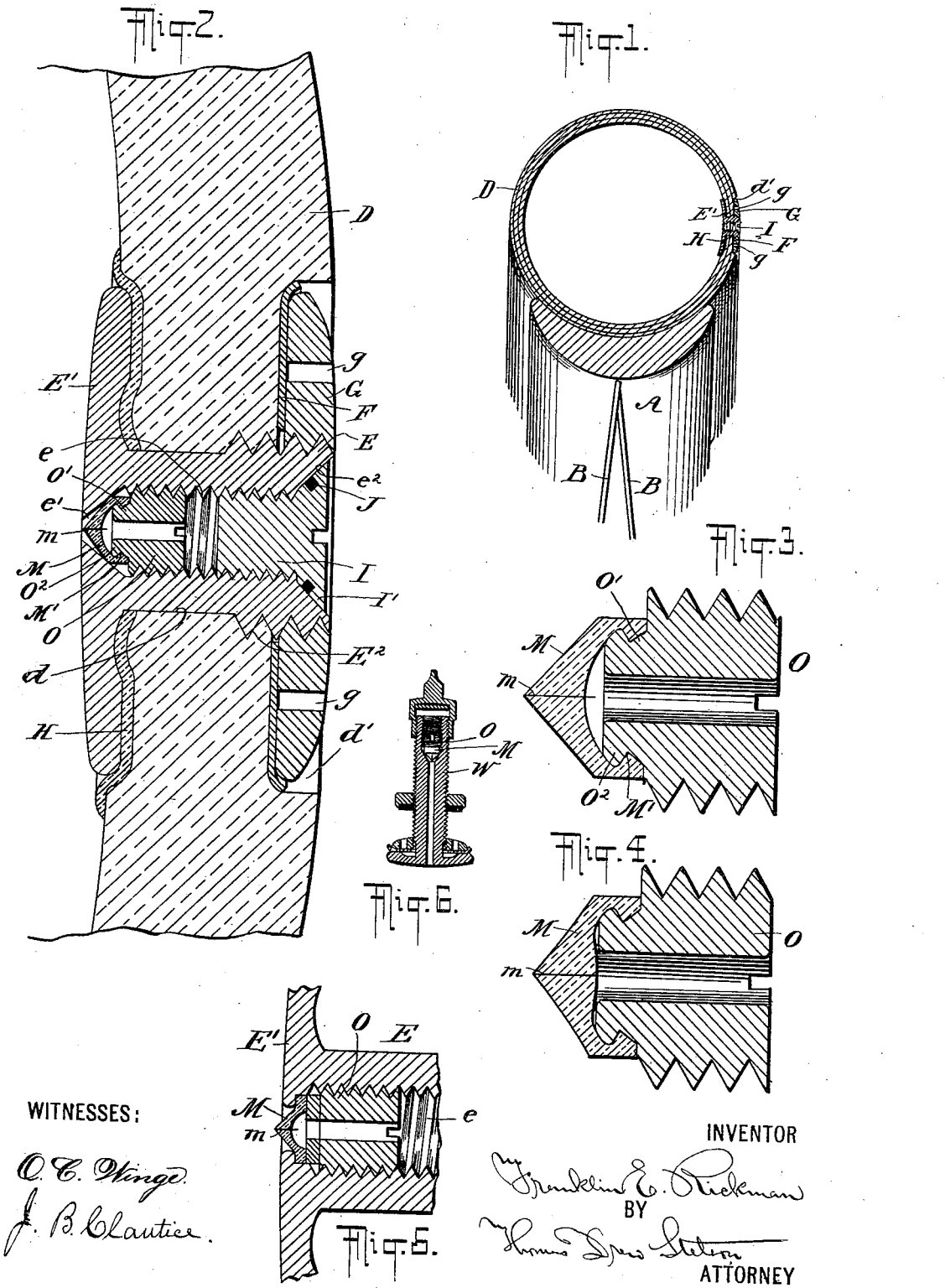
WITNESSES:
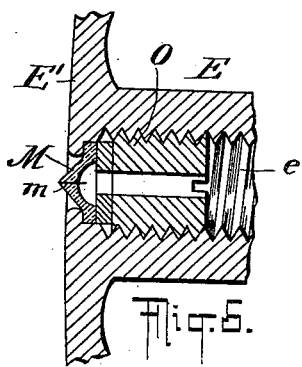
INVENTOR
Franklin E. Rickman
BY
Thomas Drew Stetson
ATTORNEY
THE NORRIS PETERS CO., PHOTO-LITHO., WASHINGTON, D. C.

UNITED STATES PATENT OFFICE.

FRANKLIN E. RICKMAN, OF NEW YORK, N. Y., ASSIGNOR OF ONE-HALF TO CARRIE AUGUSTA HAWTHORN, OF SAME PLACE.

VALVE FOR PNEUMATIC TIRES.

SPECIFICATION forming part of Letters Patent No. 621,849, dated March 28, 1899.

Application filed September 28, 1898. Serial No. 692,079. (No model.)

*To all whom it may concern:*

Be it known that I, FRANKLIN E. RICKMAN, a citizen of the United States, residing in the borough of Manhattan, in the city and State of New York, have invented a certain new and useful Improvement in Pneumatic Tires and Like Articles, of which the following is a specification.

The improvement relates to the valve and adjacent parts through which air is forced into the tire in the act of inflating.

The invention is intended mainly for bicycles, and I will describe it as thus applied. It can be embodied in other articles, as pneumatic saddles, for example, as well as in pneumatic tires, the valve occupying a relation to the air-bag or pneumatic cushion in these other articles like that which it occupies to the corresponding part of the pneumatic tire. The embodiment in a pneumatic tire being considered the principal application of the invention, this will be set forth in the following description and claims in terms of such tire, it being left to the reader to make such changes of expression or verbiage as shall adapt the same to other pneumatic articles.

The ordinary valve and adjacent parts involve a branch composed of a soft-rubber tube of small diameter connecting with the interior of the tire and extending through a hole in the wheel-rim in the direction inward toward the center of the wheel. The inflating the tire and the securing the aperture after the connection to the pump is removed are effected through the branch extending through on the inner side of the wheel-rim. It is a serious objection to the extending of the branch through the rim that if, as frequently happens with bicycles, the cement or other fastening of the tire to the rim is insufficient and the tire creeps around on the rim it strains and is liable to tear the branch. I have devised a new construction of the valve. It is advantageous to arrange the valve on some portion of the tire which is not likely to be pressed on the ground. In other words, it must not be in the "tread." I locate the valve at the side of the tire at a point just beyond the edge of the rim and dispense with the branch, making such a change in the construction and giving such dimensions and proportions to the parts that the whole can be contained in a little more than the usual thickness of the tire. The slight increase above the usual thickness of the tire at this point is mainly on the inside of the tire, so that the outside will present a practically continuous smooth surface. A wheel with such tire may run close to another portion of the machine without touching, or, if it does touch, sliding smoothly past without involving any difficulty.

The accompanying drawings form a part of this specification and represent what I consider the best means of carrying out the invention.

Figure 1 is a cross-section showing a portion of the tire adjacent to the valve. Fig. 2 is a section through the valve, showing a portion on a larger scale. Fig. 3 is a corresponding section showing a portion on a still larger scale. Fig. 4 is a section corresponding to Fig. 3, but with the flexible portion deformed by the strong pressure of the air tending to force it inward. Fig. 5 is a corresponding cross-section of certain portions, showing a modification; and Fig. 6 is a central longitudinal section, on a smaller scale, showing another modification.

Similar letters of reference indicate corresponding parts in all the figures where they appear.

A is the bicycle-rim, (represented as one of the modern continuous wood rims,) of sufficient thickness and properly shaped.

B B are the ordinary slightly-inclined spokes. It will be understood that there may be any suitable form of hub or center of the wheel and any suitable mode of construction of the nearly-radial wires, which I will term the "spokes."

D is the tire.

E is the shank of a hollow plug, of brass or other suitable metal, which extends radially through a close-fitting hole $d$ in the tire clear of the rim A and which performs important functions.

$E'$ is a smooth round head presented on the inside.

$E^2$ are screw-threads on the exterior of the shank.

G is a screw-threaded collar or thin circular nut engaged on the screw-threads E². It is swelled on its outer face and provided with holes g, as indicated in full lines in Fig. 2, by which it may be strongly turned. The pressure should be sufficient to sink it into the shallow recess d' previously formed in the exterior of the tire, so that its rounded outer surface shall stand flush with or but slightly projecting beyond the outer surface of the tire. I introduce a thin metal washer F under this nut in the bottom of the shallow recess in the outer face of the tire and introduce a thin rubber washer H under the head E' on the inner face of the tire. A screw-threaded hole e in the axis of this plug, having a contraction e' at the inner end and an enlargement e² at the outer end, but screw-threaded the main portion of its length, serves as a socket for receiving the ordinary coupling, (not shown,) through which to force in the air in the act of charging, and for receiving the solid and tightly-fitting closing-plug for the final and absolutely safe closure of the orifice after the pipe is disconnected. These parts and also the peculiarly-constructed self-acting valve which allows the air to enter with freedom and forbids its escape while the plug is removed during the periods of inflation are all made of such dimensions and so arranged that they are contained in the slight length of the shank of the screw-plug E E' a little more than the thickness of the material of the tire.

I is a tight stopping-plug screw-threaded and equipped with a packing-ring of soft rubber J, partially sunk in a circular groove produced on the conical under face of the head I'. The valve is formed of two parts M and O. The part O is a screw-threaded piece of metal, having an axial orifice extending through it and a small head O², connected by a smaller neck O' on the end, which is presented toward the interior of the tire.

M is a hollow conical cap of soft rubber, equipped with an internal flange or lip M', which can be strained over the head O² and engaged around the neck O'. The apex of the cone is slit, as indicated by m.

When the plug I I' is removed, an ordinary coupling (not shown) can be screwed into the hole e in the interior of the shank E, and on working the pump (not shown) air is forced into the tire, moving through the hollow interior of the metal portion O, which may be termed the "bed" of the valve, and continuing its movement through the slit m in the conical soft-rubber portion M. It is practicable to give such form and thickness to this small rubber piece M M' m that it will open readily against a strong pressure in the interior of the tire by a stronger pressure induced in the interior of the valve through the compressing action of the pump, and the air can thus find admission into the tire until a sufficient tension is attained, and when the pump action stops and the connection is withdrawn such hollow conical part will close under the pressure of the air on its exterior and prevent the escape of the air during the brief period while this is depended upon to retain the air before the tight plug I I' J can be applied and tightly set.

My invention will usually be applied to the tire in the course of its manufacture. In such case the screw-plug E E' and its contained parts may be introduced from the interior, and the shank E is forced easily outward through the yielding material of the tire D. Cases may arise in which it becomes necessary or expedient to introduce these parts after the tire is completed. In such case more difficulty is involved; but the highly yielding material of the tire will allow of a temporary distention sufficient to admit the head E'. The process of introducing my valve under those conditions is briefly as follows: First, apply the thin soft-rubber washer H on the hollow plug E E' and screw a stout threaded wire (not shown) into the interior of the shank E to allow it to be held and strongly operated from the outside, and, having produced a small round hole at the right point in the side of the tire D, temporarily strain open such hole sufficiently to allow the head E, which may be presented nearly edgewise, to be thrust through. Then the material D being allowed to close tightly around the shank E, the holder, which had been temporarily inserted in the shank, is unscrewed and removed, the thin metal washer F is slipped on the outer end of the shank, and the nut G is engaged on the hollow plug and turned, compressing tightly the material of D. Care should be taken to so proportion the parts that this nut may be screwed home without sinking its outer surface, so as to allow the end of the shank to extend more than flush. Preferably E is allowed to terminate a little inside of the outer face of the nut G. Before or after thus introducing these parts into their place in the tire the small soft-rubber cap M, engaged over the head O² and the valve-bed O O' O² thus equipped, is engaged with the screw-threads in the interior of the shank E and screwed down until it is home. This, after the proper inflating of the tire as above, is followed by the final holding-plug I I', with its tight-fitting packing-ring J.

The soft-rubber part M M' m allows the compressed air in the tube to act around the conical inward projection and close the slit m very tightly. In case the pressure obtaining within the tube is so great as to further change the form of the soft-rubber part M after it has closed the slit m it will simply contract its length.

The end of the head O² is flattened to afford a reliable support to the conical soft rubber M when the air-forcing means are removed, and this valve is alone depended upon to resist the strong pressure of the air which distends the tire. Such pressure can only flatten the conical end of M upon the flat face which forms the inner end of the valve-bed O O′ O². It does not allow the air to escape, but rather holds it with more tightness under these conditions. Fig. 4 shows the form which the soft rubber M may assume when the tension of the compressed air in the tire is very great.

Modifications may be made without departing from the principle or sacrificing the advantages of the invention. The screw-threads E² may extend farther along on the shank E, even quite to the head E′. The recess on the outer face of the tire to allow the round nut G to sink in, so that its outer face shall be nearly flush, may be shallower, so that the outer face may project more; but in such case it is important that its edge be beveled, so that if the front tire thus equipped through any maladjustment or great strain hits the fork it will glide smoothly by.

Parts of the invention may be used without the whole. I can dispense with the interior lip M′ on the soft-rubber cap M, and in such case can omit the small head O′ and the smaller neck O². Fig. 5 shows such a construction. With this form of the invention the cap M, without the internal lip M′, is inserted dexterously in its place, being forced inward through the screw-threaded interior of the main plug E by the aid of a wire or other simple pusher, (not shown,) and after it has been carefully set in place, with its slitted point protruding a little beyond the face of the head I′, the pusher, by which it is inserted, is withdrawn and the hard bed O is introduced and turned until it bears properly against the plain lip or rim of the soft-rubber cap, holding it simply by concussion induced between itself and the interior of the contraction e′. This will serve usefully; but I prefer the construction first described.

The length and taper of the conical cap M may be varied. It may vary considerably from a strictly conical form.

In the modification shown in Fig. 6 the hard bed O, with its neck and head corresponding to the neck O′ and head O² in Figs. 2, 3, and 4, is fitted into the ordinary barrel W, which may extend, as usual, through the wheel-rim. (Not shown.) The hard portion O is screwed down into the interior of the barrel, and the rubber cone M, with its slit m, performs in a similar manner to that in the other forms of the invention.

I claim as my invention—

1. The hollow screw-plug E approximating in length the thickness of the tire and set in the same, said plug having the inner head, outer externally-threaded portion and longitudinal orifice e, in combination with a thin nut engaging said externally-threaded portion and compressing the tire material to occupy a depression therein, and a suitable valve device located in the plug, substantially as herein specified.

2. The hollow screw-plug E set in the tire, having its entire length but little greater than the thickness of a tire, provided with external screw-threads E² and internal screw-threaded orifice e, in combination with the pneumatic tire D, having the hole d and the sunk area d′ surrounding the same on the exterior face, the thin nut G engaged by the outer threads with the screw-plug and sunk tightly into said recess, and a suitable automatic valve device engaged by the inner threads at the inner end of the screw-plug, all arranged to serve substantially as herein specified.

3. The hollow screw-plug E approximating in length the thickness of the tire and set in the same, said plug having the inner head, outer externally-threaded portion and longitudinal orifice e, in combination therewith, an outer securing-nut G, an automatic valve device located within the orifice e and comprising a hollow cap M of rubber or analogous yielding material, having a thin aperture or slit m, and a hollow plug O having the cap M engaged with its inner end to be carried and held thereby in position to support it against back pressure, substantially as herein specified.

4. The hollow screw-plug E approximating in length the thickness of the tire and set in the same, said plug having the inner head, outer externally-threaded portion and longitudinal orifice e, reduced at its inner end by the contraction e′, in combination therewith, an outer securing-nut G, an automatic valve device located in said orifice and comprising a hollow cap M of rubber or analogous yielding material having a thin aperture or slit m, and a hollow plug O, having the cap, M, engaged with its inner end to be carried and held thereby in position to support it against back pressure, substantially as herein specified.

5. In a valve for pneumatic tires, the hollow screw-plug E and means for holding it, provided with the axial passage e having the contraction e′ at the inner end and the enlargement e² at the outer end, in combination with a valve device comprising the flexible cap M having the slit m and the hollow valve-bed O, with provisions as screw-threads for adjusting the bed to confine the cap within the contracted end, and with the closing-plug I having a packing-ring J attached, all arranged to serve substantially as herein specified.

In testimony that I claim the invention above set forth I affix my signature in presence of two witnesses.

FRANKLIN E. RICKMAN.

Witnesses:
J. B. CLAUTICE,
M. F. BOYLE.